United States Patent
Huang (10) Patent No.: US 9,451,619 B2
(45) Date of Patent: Sep. 20, 2016

(54) RADIO RESOURCE MANAGEMENT FOR PACKET DATA SERVICES

(71) Applicant: Alcatel-Lucent USA Inc., Murray Hill, NJ (US)

(72) Inventor: Joe Huang, Montville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 109 days.

(21) Appl. No.: 14/320,136

(22) Filed: Jun. 30, 2014

(65) Prior Publication Data
US 2015/0382359 A1    Dec. 31, 2015

(51) Int. Cl.
H04W 4/00 (2009.01)
H04W 72/04 (2009.01)
H04W 72/12 (2009.01)

(52) U.S. Cl.
CPC ..... *H04W 72/0486* (2013.01); *H04W 72/1252* (2013.01)

(58) Field of Classification Search
CPC ............... H04W 28/00; H04W 28/02; H04W 28/0231; H04W 28/0236; H04W 28/08; H04W 28/10; H04W 72/0486; H04W 72/1294; H04W 72/14
See application file for complete search history.

(56) References Cited

U.S. PATENT DOCUMENTS

| | | | | |
|---|---|---|---|---|
| 6,003,089 A * | 12/1999 | Shaffer | .................. | H04L 47/36 370/232 |
| 2004/0052212 A1* | 3/2004 | Baillargeon | .......... | H04L 1/0002 370/235 |
| 2004/0209624 A1* | 10/2004 | Rune | ..................... | H04W 28/08 455/453 |
| 2006/0003787 A1* | 1/2006 | Heo | ..................... | H04W 52/146 455/522 |
| 2007/0225015 A1* | 9/2007 | Mueckenheim | .... | H04L 12/5693 455/453 |
| 2007/0233866 A1* | 10/2007 | Appleby | ............. | H04L 67/1008 709/226 |
| 2008/0151819 A1* | 6/2008 | Bachl | .................. | H04W 52/146 370/329 |
| 2015/0098404 A1 | 4/2015 | Lau et al. | | |
| 2015/0305044 A1 | 10/2015 | Wigren et al. | | |

FOREIGN PATENT DOCUMENTS

| | | |
|---|---|---|
| EP | 2850904 | 3/2015 |
| WO | WO 2013/172747 | 11/2013 |
| WO | WO 2015/115950 | 8/2015 |

OTHER PUBLICATIONS

International Search Report and Written Opinion correlating to PCT/US15/036316 dated Dec. 16, 2015, 10 pages.

* cited by examiner

*Primary Examiner* — Kan Yuen
(74) *Attorney, Agent, or Firm* — Davidson Sheehan LLP (57) ABSTRACT

Systems and methods for control of a radio resource for packet data services are provided to facilitate radio resource management. One embodiment comprises a radio network element of a Packet-Switched (PS) network that serves User Equipment (UE). The radio network element determines a value for a summation of load contribution from one or more UEs, the load contribution for respective ones of the one or more UEs based on a minimum grant for the respective ones of the one or more UEs; and manages a radio resource based on the value of the summation. The minimum grant may be a grant required to transport a minimum transport block size. An example method may determine a color status based on the value of the summation with respect to a scale of virtual loading, and make a radio resource management decision concerning the radio resource based on the color status.

22 Claims, 5 Drawing Sheets

RADIO RESOURCE MANAGEMENT FOR PACKET DATA SERVICES

FIELD OF THE INVENTION

The invention is related to the field of communication systems and, in particular, to radio resource management for packet data services in a communication system.

BACKGROUND

Service providers typically offer numerous voice and data services to end users of mobile devices. Some examples of voice services are voice calls, call forwarding, call waiting, etc. Some examples of data services are Internet access, streaming audio, streaming video, online gaming, Internet Protocol television (IP-TV), etc.

The first types of wireless or mobile networks that were introduced by services providers were First Generation (1G) and Second Generation (2G) networks. 1G networks provided voice services via analog signals, and then evolved into 2G networks that provided voice services via digital signals. Mobile communications then evolved into 3G (including 2.5G) networks that provided both voice services and data services. For example, 3G networks are able to provide wireless voice telephony, as well as data services such as Internet access, video calls, mobile TV, etc. Some of the 3G networks implemented by service providers were Universal Mobile Telecommunications System (UMTS) networks, Enhanced Voice Data Optimized (EV-DO) networks, General Packet Radio Service (GPRS) networks, etc. Service providers are now beginning to migrate their networks toward Fourth Generation (4G) technologies over Packet-Switched (PS) networks. 4G networks are essentially enhancements to 3G networks in terms of data speeds. For example, a 3G network can provide data speeds of about 3.5 Mbit/sec. According to the International Telecommunication Union (ITU), a 4G network can provide data speeds of 100 Mbit/sec. One example of a 4G network is a Long Term Evolution (LTE) network.

When a mobile device initiates a session over a PS network (e.g., an IP Connectivity Access Network (IP-CAN) session), the session request from the mobile device includes a description of the requested service (e.g., online gaming, IP-TV, etc). The PS network authenticates the mobile device and determines which services the mobile device is authorized to receive. If the requested service is authorized, then the PS network reserves a bearer path (e.g., an IP CAN bearer) of a defined capacity, delay, and bit error rate over a selected Packet Data Network (PDN). A flow of packets may then begin for the service, which is referred to as a data flow or a service data flow over the PDN.

For example, a High Speed Uplink Packet Access/Enhanced Dedicated Channel (HSUPA/EDCH) system achieves high data rates for packet data services by introducing a number of optimizations over the air. One of the key characteristics of HSUPA is the support of flexible bandwidth scheduling. A User Equipment's (UE's) power allocation to transmit data can vary dynamically based on the current channel condition, a Quality of Service (QoS) requirement, and the amount of data that needs to be transmitted. The goal of flexible bandwidth scheduling is to share the uplink power in the most effective way possible. In this regard, an EDCH scheduler is responsible to monitor the communication system load and assign scheduling grant to the different UEs in the system based on an individual UE's need and radio condition and the overall communication system loading. On the other hand, such high flexibility also poses a challenge on radio resource management (RRM), due to the lack of predictability. If the calls are admitted without bound, there will be a point that the EDCH scheduler can not respond effectively such that either the total communication system load will go out of bound or individual UE/UEs will be starved of scheduling grants (thus leading to call drop), or both.

To resolve this issue, there are at least two conventional approaches. First, the communication system can impose a hard limit on the maximum number of EDCH users, beyond which EDCH calls will be rejected. Second, communication system can utilize the actual total communication system load as the criteria for call admission.

SUMMARY

One or more embodiments described herein utilize a virtual load calculation mechanism to help determine how close a communication system is to overload to facilitate effective Radio resource Management (RRM). The total load is nominally determined by the summation of a virtual load contribution from all channel users.

One embodiment comprises a method of radio resource management for packet data services. The method includes determining at a radio network node a value for a summation of load contribution from one or more User Equipments (UEs), the load contribution for respective ones of the one or more UEs based on a minimum grant for the respective ones of the one or more UEs; and managing at least one radio resource based on the value of the summation.

In another embodiment, the minimum grant is a grant required to transport a minimum transport block size.

In another embodiment, the minimum grant is a grant assigned to a user of a channel (e.g., an Enhanced Dedicated Channel (EDCH)) when a radio network to which the radio network node belongs is loaded above a threshold.

In another embodiment, determining a value for a summation of load contribution from one or more UEs includes assigning the minimum grant as the load contribution for individual of the one or more UEs, normalizing the load contribution for the individual of the one or more UEs based on an activity factor for the individual, and summing the value from the load contribution that was normalized for the one or more UEs.

In another embodiment, the load contribution for the respective ones of the one or more UEs is based on the minimum grant and an activity factor for the respective ones of the one or more UEs.

In another embodiment, the activity factor for a first UE of the respective ones of the one or more UEs accounts for transmission of less than a transport block allowed by the minimum grant to the first UE.

In another embodiment, managing the radio resource based on the value of the summation includes comparing the value of the summation to one or more thresholds, and controlling a setting for the at least one radio resource based on the comparing.

In another embodiment, the at least one radio resource is a Transmission Time Interval (TTI) size, a Packet Data Unit (PDU) size, a channel type over which to send Signal Radio Bearer (SBR), a status trigger for traffic redirection (e.g., Intelligent Multi-Carrier Traffic Allocation (iMCTA)), a status indicator for call admission, a status indicator for outer loop power control usage; a status indicator for usage of a power-offset table for scheduling, or a status indicator for High Speed Uplink Packet Access (HSUPA) cell configuration. Thus, one or more of the listed radio resources can managed or controlled based on the value of the summation.

In another embodiment, managing the radio resource based on the value of the summation includes determining a color status based on the value of the summation with respect to a scale of virtual loading, and making a radio resource management decision concerning the at least one radio resource based on the color status.

In another embodiment, making a radio resource management decision includes one or more of deciding whether to use a Transmission Time Interval (TTI) of a first size or a TTI of a second size for a call with one of the one or more UEs, deciding whether to use a first Packet Data Unit (PDU) size or a second PDU size for a call with one of the one or more UEs, deciding whether to use a Signal Radio Bearer over an Enhanced Dedicated Channel (EDCH) or SRB over a Dedicated Channel (DCH) for a call with one of the one or more UEs, deciding whether to trigger Intelligent Multi-Carrier Traffic Allocation (iMCTA) to redirect traffic for a call with one of the one or more UEs, deciding whether to reject a call with one of the one or more UEs, deciding whether to switch outer loop power control parameters for a call with one of the one or more UEs, deciding whether to switch power-offset table for scheduling a call with one of the one or more UEs; deciding whether to activate at least one secondary carrier in a Dual Cell or Multi-Cell High Speed Uplink Packet Access (HSUPA) configuration for a call with one of the one or more UEs; or any combination thereof. Thus, one or more of the listed steps of deciding can constitute making a radio resource management decision.

In another embodiment, an apparatus for radio resource management for packet data services of a radio network includes a processor and an associated memory. The processor is configured to determine a value for a summation of load contribution from one or more User Equipments (UEs), the load contribution for respective ones of the one or more UEs based on a minimum grant for the respective ones of the one or more UEs, and to manage at least one radio resource based on the value of the summation.

In another embodiment, the minimum grant is a grant required to transport a minimum transport block size.

In another embodiment, the minimum grant is a grant assigned to a user of an Enhanced Dedicated Channel (EDCH) when the radio network is loaded above a threshold.

In another embodiment, the processor is configured to assign the minimum grant as the load contribution for individual of the one or more UEs, to normalize the load contribution for the individual of the one or more UEs based on an activity factor for the individual, and to sum the value from the load contribution that was normalized for the one or more UEs.

In another embodiment, the activity factor for the individual of the one or more UEs accounts for transmission of less than a transport block allowed by the minimum grant to the individual.

In another embodiment, the processor is configured to forward the value of the summation of load contribution to a controller for determination of a setting for the at least one radio resource, to receive from the controller the setting for the at least one radio resource, and to configure the at least one radio resource according to the setting for the at least one radio resource.

In another embodiment, an apparatus for radio resource management for packet data services of a radio network includes a processor and an associated memory. The processor is configured to receive a value for a summation of load contribution from one or more User Equipments (UEs), the load contribution for respective ones of the one or more UEs based on a minimum grant for the respective ones of the one or more UEs, and to manage at least one radio resource based on the value of the summation.

In another embodiment, the processor is configured to determine a setting for the at least one radio resource based on the value of the summation in comparison to one or more thresholds.

In another embodiment, the at least one radio resource is a Transmission Time Interval (TTI) size, a Packet Data Unit (PDU) size, a channel type over which to send Signal Radio Bearer (SBR), a status trigger for Intelligent Multi-Carrier Traffic Allocation (iMCTA), a status indicator for call admission, a status indicator for outer loop power control usage; a status indicator for usage of a power-offset table for scheduling; a status indicator for High Speed Uplink Packet Access (HSUPA) cell configuration.

In another embodiment, the processor is configured to determine a color status based on the value of the summation with respect to a scale of virtual loading, and to make a radio resource management decision concerning the at least one radio resource based on the color status.

In another embodiment, the processor is at least one of configured to decide, based on the color status, whether to use a Transmission Time Interval (TTI) of a first size or a TTI of a second size for a call with one of the one or more UEs; configured to decide, based on the color status, whether to use a first Packet Data Unit (PDU) size or a second PDU size for a call with one of the one or more UEs; configured to decide, based on the color status, whether to use a Signal Radio Bearer over an Enhanced Dedicated Channel (EDCH) or SRB over a Dedicated Channel (DCH) for a call with one of the one or more UEs; configured to decide, based on the color status, whether to trigger Intelligent Multi-Carrier Traffic Allocation (iMCTA) to redirect traffic for a call with one of the one or more UEs; configured to decide, based on the color status, whether to reject a call with one of the one or more UEs; configured to decide, based on the color status, whether to switch outer loop power control parameters for a call with one of the one or more UEs; configured to decide, based on the color status, whether to switch power-offset table for scheduling a call with one of the one or more UEs; or configured to decide, based on the color status, whether to activate at least one secondary carrier in a Dual Cell or Multi-Cell High Speed Uplink Packet Access (HSUPA) configuration for a call with one of the one or more UEs.

Other exemplary embodiments may be described below.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Various embodiments described herein provide radio resource management for packet data services for a radio network and utilize a virtual load calculation of the summation of a virtual load contribution from all channel users to control one or more radio resources. The invention will be primarily described within the context of a High Speed Uplink Packet Access/Enhanced Dedicated Channel (HSUPA/EDCH) system. However, it will be appreciated that the invention is also applicable to radio communication systems and the like suitable for use in various other arrangements which are also contemplated by the inventors as benefiting from the invention.

Figure 1:
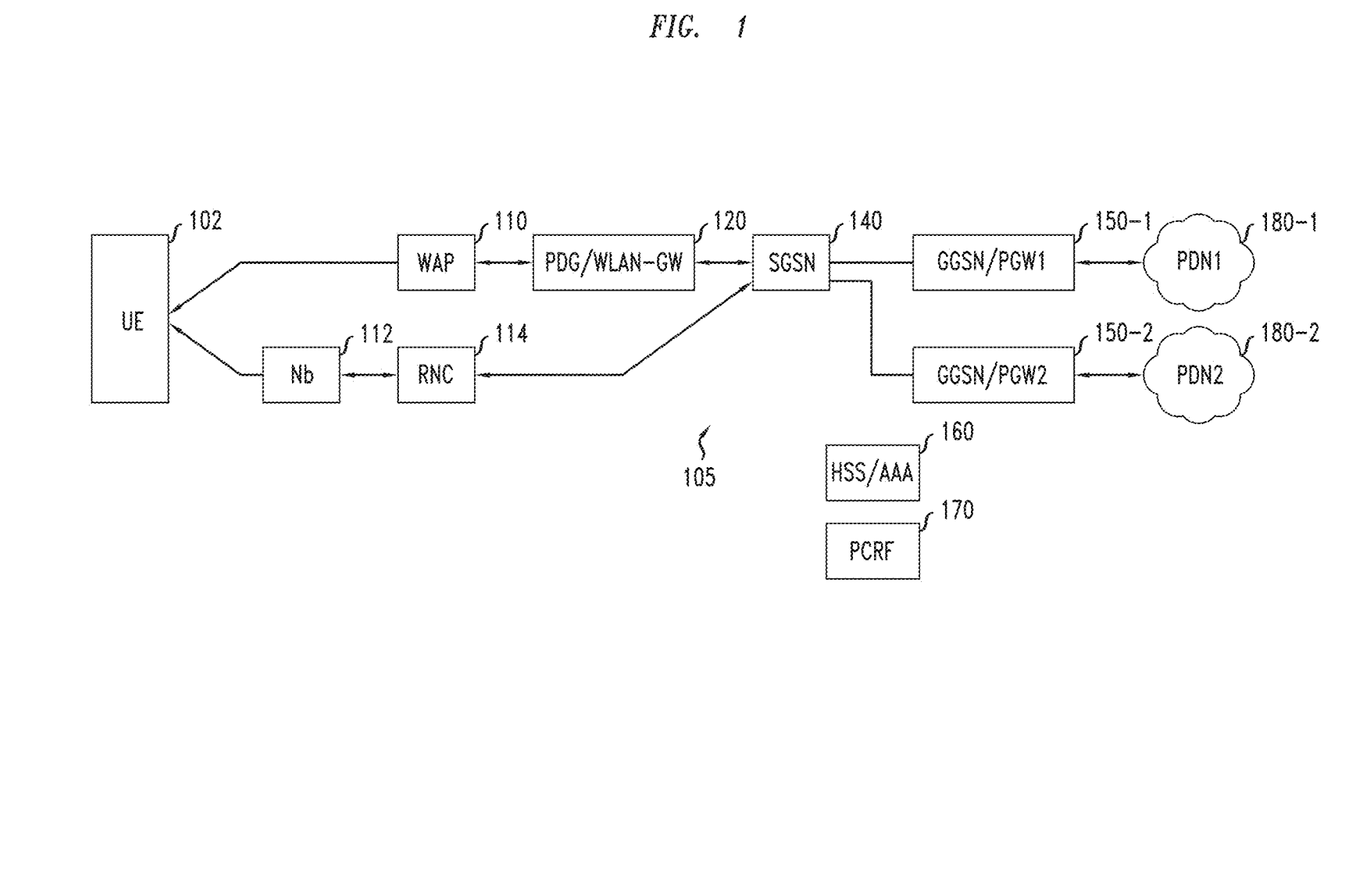
FIG. 1 illustrates a high-level block diagram of a communication system benefitting from one or more exemplary embodiment described herein.

FIG. 1 depicts a high-level block diagram of a system benefiting from one or more embodiments. Generally speaking, the system 100 of FIG. 1 contemplates one or more user equipment (UE) (only one shown) illustratively capable of accessing a mobile network via NodeB and a Radio Network Controller (RNC) or via a wireless access point (WAP). The mobile network may comprise a 3G/4G mobile network such as a 3GPP network, Universal Mobile Telecommunications System (UMTS) network, long-term evolution (LTE) network and so on. The WAP may be associated with a Wi-Fi, WiMAX or other wireless access network. Various embodiments provide a mechanism whereby radio resource management for the one or more UE is based on a virtual load of the radio network.

Specifically, the system 100 of FIG. 1 comprises, illustratively, user equipment (UE) 102, Wireless Access Point (WAP) 110, NodeB 112, Radio Network Controller (RNC) 114, Packet Data Gateway (PDG)/Wireless LAN gateway (WLAN-GW) 120, Serving GPRS Support Node (SGSN) 140, first 150-1 and second 150-2 Gateway GPRS Support Node (GGSN)/Packet Gateway (PGW), Home Subscriber Server (HSS)/Authentication, Authorization and Accounting (AAA) server 160, Policy and Charging Rules Function (PCRF) 170 and various other network elements (not shown) supporting control plane and/or data plane operations. The WAP 110 comprises a portion of an Access Network. The NodeB 112 and RNC comprise a portion of another Access Network. The various Gateways comprise portions of a Packet Switched (PS) core network.

Generally speaking, UE 102 communicates with a Packet Data Gateway (PDG) or Wireless Local Area Network Gateway (WLAN-GW) 120 via a Wireless Access Point (WAP) 110 to receive mobile services thereby. The WAP 110 controls the radio/air interface to the UE 102. The mobile services are communicated between the PDG/WLAN-GW 120 and a first Gateway GPRS Support Node (GGSN) or packet Gateway (PGW) 150-1 via a tunnel such as a GPRS Tunneling Protocol (GTP) tunnel 201. The GGSN/PGW 150-1 communicates with a Packet Data Network (PDN) 180-1, such as the Internet.

Generally speaking, UE 102 communicates with a Serving GPRS Support Node (SGSN) 140 via a NodeB 112 as controlled by Radio Network Controller (RNC) 114 to receive mobile services thereby. The NodeB 112 and RNC may individually or in combination control the radio/air interface to the UE 102. Again, the mobile services are communicated between the SGSN 1400 and a first GGSN or PGW 150-1 via a tunnel such as a GTP tunnel 201. The GGSN/PGW 150-1 communicates with a PDN 180-1. Within the context of the system 100 of FIG. 1, it is noted that SGSN 140 and GGSN/PGW 150 are depicted as providing a Service Data Flow (SDF) or Application Flow (AF) to a UE 102.

UE 102 is a mobile device, such as a mobile phone, a computer, a tablet, etc. and may also be referred to as a subscriber or user. UE 102 is able to access a Packet Switched (PS) core network through an access network. An access network comprises any type of network that interfaces UEs with PS core network. One example of access network is a Radio Access Network (RAN), such as a UMTS Terrestrial Radio Access Network (UTRAN), an enhanced UTRAN (E-UTRAN), an Interworking-Wireless Local Area Network (I-WLAN), etc.

As described above, flexibility scheduling based on individual UE's need and radio condition and overall system loading poses a challenge on the radio resource management (RRM), due to the lack of predictability. If the calls from UEs are admitted without bound, there will be a point that radio scheduler (e.g., EDCH scheduler) can not respond effectively such that either the total system load will go out of bound or individual UE will be starved of grants (thus leading to call drop), or both. To resolve this issue, there are at least two conventional approaches. First, the communication system can impose a hard limit on the maximum number of EDCH users, beyond which EDCH calls will be rejected. Second, communication system can utilize the actual total communication system load as the criteria for call admission.

Figure 2:
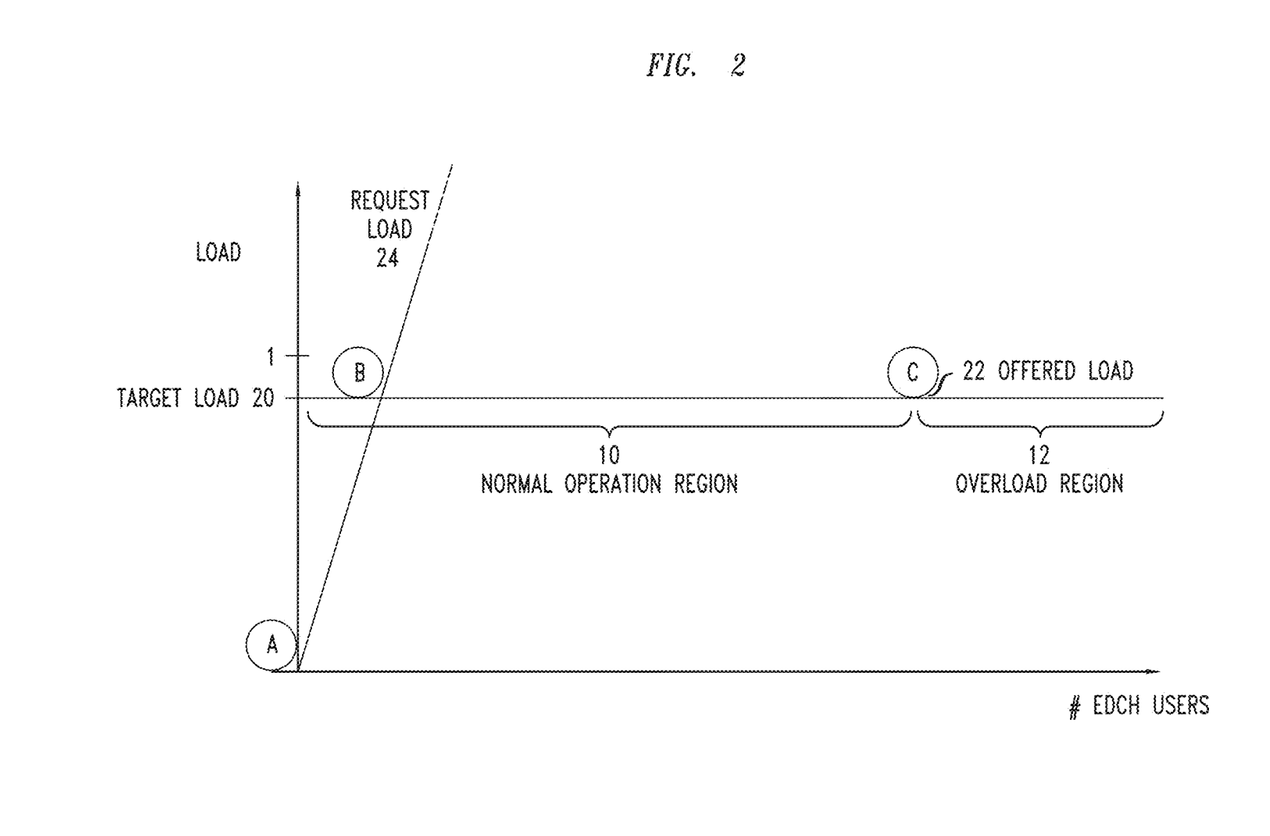
FIG. 2 is a graph illustrating issues for radio resource management for packet data services that are addressed by embodiments described herein.

FIG. 2 is a graph illustrating issues for radio resource management for packet data services that are addressed by embodiments described herein. The graph illustrates the number EDCH users versus the radio access network load. Assume that there is a target load 20 for the system, which is below the total load capacity of the radio access network. For example, the target load may be eighty-five percent (85%) of the total load capacity (1; 100%). The target load can be reduced when the Received Total Wideband Power (RTWP) for the access point or cell of the radio access network rises above a threshold. RTWP is the total level of noise within a given frequency band of a receiver for an access point or cell. For example, if the measured total RTWP (e.g., Received Signal Strength Indicator (RSSI)) exceeds the target maximum RTWP, an EDCH scheduler will gradually reduce the default target load, reducing the room to allocate grants, and thus reducing cell throughput.

In the portion of the normal operation region 10 between point A and point B, the target load is not reached even if UEs receive maximum grant. Thus, all requested load 24 requested by UEs can be provided through grants and the offered load 22 tracks the requested load 24.

In the portion of the normal operation region 10 between point B and point C, the requested load 24 exceeds the target load 20. Accordingly, the scheduler will reduce grants to keep the offered load 22 at the target load 20. The scheduler maintains the offered load at the target load in order to maximize utilization of the radio network. In this range of the normal operation region, the Received Total Wideband Power (RTWP) will remain approximately "constant". However, the radio network controller can not distinguish whether the network load of a particular cell load is proximate point B (i.e., low load) or point C (i.e., beginning of overload). At point C, the radio network is fully loaded, with all users having been granted a minimum grant.

Beyond point C, the radio network enters an overload region 12. All users are granted a minimum grant but the offered load is now above the target load. The scheduler has no further possibility to reduce the load via grant handling. Any additional users are likewise provided a minimum grant and as a result the RTWP value will increase sharply with even this small load increase.

As described earlier, a hard limit can be imposed on the maximum number of EDCH users, beyond which EDCH calls will be rejected. While a hard limit on the number of users can help protect a radio access network from overload, it is not efficient because the overall system load is not simply determined by the number of users (e.g., EDCH users). In particular, overall system load also depends strongly on the individual UE's radio conditions, amount of data to send . . . etc. Furthermore, the use of the actual total system load as the criteria for call admission is also not effective. For example, a scheduler is designed to maximize the overall uplink power usage, within the load target. Even if there are only few EDCH users in the radio network, the scheduler will try to allow the EDCH users to send as much data as possible, up to the system target load. When more EDCH users enter the system, each user will receive less and less grant, maintaining the total system load on the target load. In this regard, the total system load does not reflect whether the system is in light load or close to overload, thus can not be used as an effective measure for radio resource management. Once there are too many EDCH users, to the point the EDCH scheduler can not effectively maintain the system load, the system performance might have already been degraded. Thus, a radio network that utilizes actual total system load as the criteria for radio resource management will only discover an overload too late and after the fact.

Figure 3:
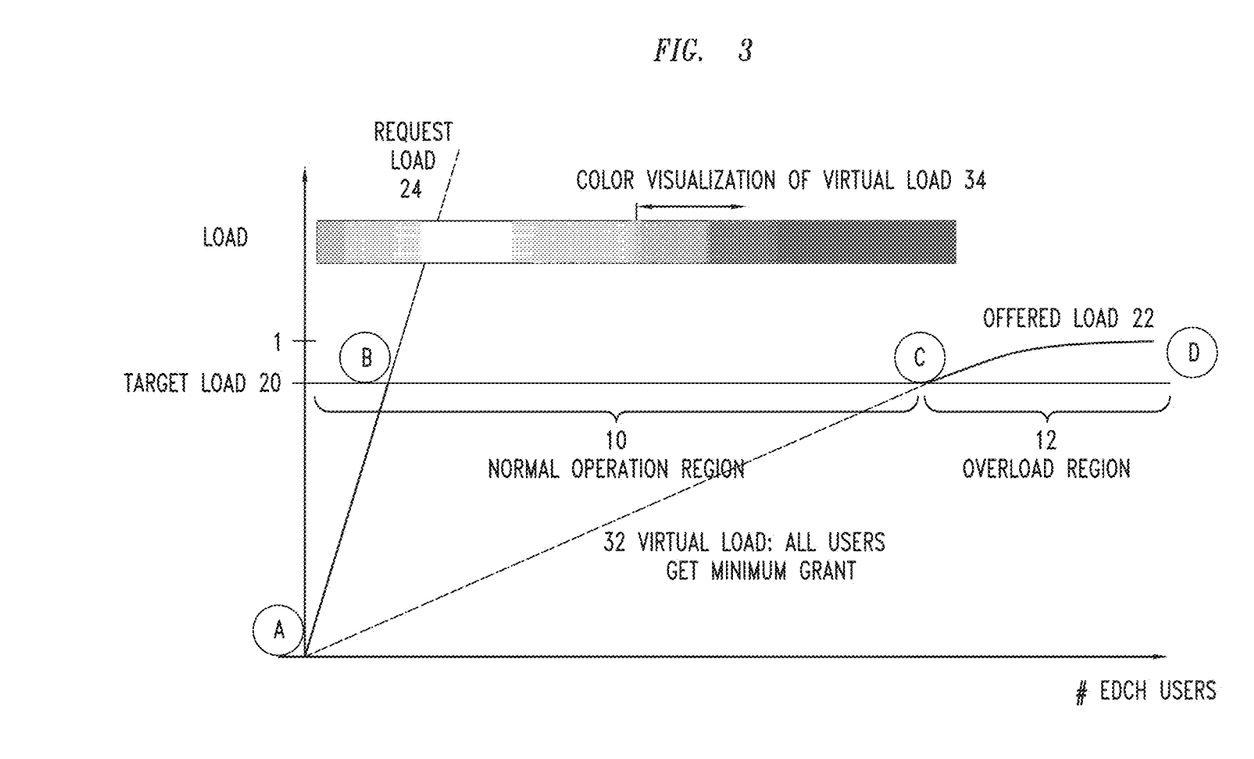
FIG. 3 is a graph illustrating radio resource management for packet data services according to embodiments described herein.

FIG. 3 is a graph illustrating radio resource management for packet data services according to embodiments described herein. Embodiments according to the principles of the invention propose the use of a virtual load calculation to facilitate effective Radio Resource Management (RRM). For example, the virtual load may be used to determine how close a radio network is to overload to facilitate effective RRM. For instance, the total EDCH load is nominally determined by the summation of load contribution from all EDCH users, where individual user's load contribution is determined by the measured Chip Energy over Interference (EcIo) multiplied by the Traffic to Pilot power Ratio (TPR), that corresponds to the received transport block size. The mapping between transport block size and TPR is defined in 3GPP TS 25.321, herein incorporated by reference. On the other hand, the virtual load according to the principles of the invention is determined by the measured EcIo multiplied by the TPR that corresponds to a single MAC-d PDU, corresponding to the minimum grant that the scheduler will assign to a user when the system load is over a threshold (e.g., assigned to an EDCH user when the system is heavily loaded or in overload). Note that if the scheduler assigns less than the minimum grant, the call is prone to be dropped.

In addition, an activity factor can be included in the virtual load calculation. The activity factor may be determined based on the received transport block size (TBS), e.g., activity factor=min(1, BS_received/TBS_1PDU). The load contribution for a user is modified by the activity factor. If no transport block is received from a particular user, the load contribution from that user will be zero. As a result, the virtual load will be much smaller than the total system load when the system is lightly loaded. As the system becomes more and more loaded, each user will get less and less grant. As the system becomes heavily loaded, more and more user will get only the minimum grant, at the same time the virtual load will become closer and closer to the actual system load. As a result, embodiment according to the principles of the invention can assess the closeness to a threshold (e.g., overload) by monitoring the level of virtual load (while the total system load maintains the constant target load level).

The graph in FIG. 3 illustrates the number EDCH users versus the radio access network load. Assume that there is a target load 20 for the system which is below the total load capacity of the radio access network. For example, the target load may be eighty-five percent (85%) of the total load capacity (1). The target load can be reduced when the RTWP for the access point or cell of the radio access network rises above a threshold.

A value for a summation of load contribution from one or more UEs can be determined and a radio resource managed based on the value of the summation. The load contribution for respective ones of the one or more UEs may be based on a minimum grant for the respective ones of the one or more UEs. The minimum grant may be a grant required to transport a minimum transport block size. The minimum grant may be a grant assigned to a user of a channel when a radio network to which the radio network node performing the management function belongs is loaded above a threshold. The minimum grant is a grant assigned to a user of an Enhanced Dedicated Channel (EDCH) when a radio network to which the radio network node performing the management function belongs is loaded above a threshold.

The load contribution for each UE may also be modified according to an activity factor. The load contribution for respective ones of the one or more UEs may be based on the minimum grant and an activity factor for the respective ones of the one or more UEs. The activity factor for a UE accounts for transmission of less than a transport block allowed by the minimum grant to the UE. Thus, determining the virtual load may include assigning the minimum grant as the load contribution for individual of the one or more UEs, normalizing the load contribution for the individual of the one or more UEs based on an activity factor for the individual, and summing the value from the load contribution that was normalized for the one or more UEs.

For example, in the portion of the normal operation region 10 between point A and point B, the target load is not reached even if UEs receive maximum grant. The grant decision for a UE and other radio resource management decisions can be based on the summation of a minimum grant contribution for each UEs being scheduled by the radio access node for a particular cell or WAP. Other radio resource management decisions may impact Transmission Time Interval (TTI) size, Packet Data Unit (PDU) size, channel type over which to send Signal Radio Bearer (SBR), traffic redirection, call admission, outer loop power control usage, usage of a power-offset table for scheduling, High Speed Uplink Packet Access (HSUPA) cell configuration, etc. and the like. Thus, all requested load 24 requested by UEs can be provided through grants and the offered load 22 tracks the requested load 24. As the number of users increases, the virtual load 32 (calculated as a sum of minimum grant for each user) increases.

In the portion of the normal operation region 10 between point B and point C, the requested load 24 exceeds the target load 20. Based on the determined summation of the a virtual load contributions, the scheduler is able to distinguish whether the network load of a particular cell load is proximate point B (i.e., low load) or point C (i.e., beginning of overload). Accordingly, the scheduler (e.g., RNC, WAP and the like) can make radio resource management decisions based on the value of summation. Exemplary radio resource management decision includes deciding for a call with one of the one or more UEs whether to use a Transmission Time Interval (TTI) of a first size (e.g., 10 ms) or a second size (e.g., 2 ms); deciding whether to use a first Packet Data Unit (PDU) size (e.g., 336 bits) or a second PDU size (e.g. 656 bits), deciding whether to use a Signal Radio Bearer over an Enhanced Dedicated Channel (EDCH) or SRB over a Dedicated Channel (DCH), deciding whether to redirect traffic such a via Intelligent Multi-Carrier Traffic Allocation (iMCTA), deciding whether to reject a call (e.g., call admission control), deciding whether to switch outer loop power control parameters, deciding whether to switch the power-offset table used for scheduling, deciding the configuration for a secondary carrier (e.g., Dual Cell or Multi-Cell High Speed Uplink Packet Access (HSUPA) configuration), etc., or any combination of RRM decisions.

For example, the scheduler can compare the value of the summation to one or more thresholds, and controlling a setting for the at least one radio resource based on the comparing. For example, the scheduler can determine a color status based on the value of the summation with respect to a scale of virtual loading. The scale of virtual loading is represented in FIG. 3 as a color scale 34. For instance, Green may represent a Light load, Yellow may represent Moderate load; Red may represent High load; and black may represent Overload. The color scale can range from the color green on the left hand side of color scale 34, with a minimal number of users and minimal virtual load (e.g., up to 40%); to the color yellow with a first number of users and a first threshold virtual load (e.g., up to 50%); to the color orange with a second number of users and a second threshold virtual load (e.g., up to 70%); to the color red with a third number of users and a third threshold virtual load near the overload region 12 (e.g., up to 80%); to the color black with a forth number of users and a forth threshold virtual load (e.g., up to 85%) near the overload region 12. The scheduler can make a radio resource management decision concerning the at least one radio resource based on the color status that is determined. Any desired number of thresholds and colors is possible. For example, a threshold can be established just below the load that will cause overload, such that a virtual load above this threshold will result in a black color status; based on the black color status, an incoming call can be redirected via iMCTA to avoid overload.

With respect to FIG. 3, in the portion of the normal operation region 10 between point A and point B, the virtual load has a green color status and the target load is not reached even if UEs receive maximum grant. Thus, all requested load 24 requested by UEs can be provided through grants and the offered load 22 tracks the requested load 24.

Figure 4:
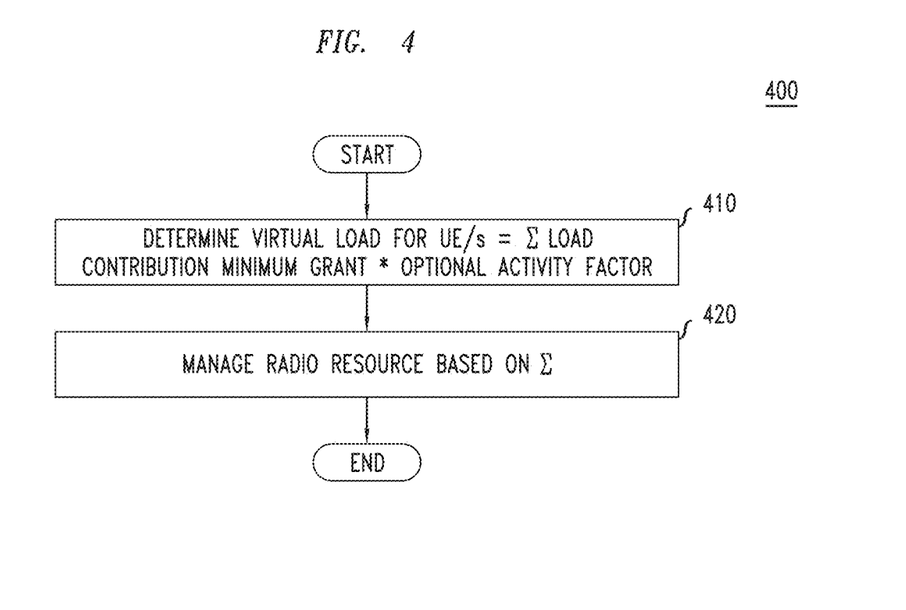
FIG. 4 is a flow chart illustrating a method of radio resource management for packet data services according to one or more example embodiments described herein.

In the portion of the normal operation region 10 between point B and point C, the requested load 24 exceeds the target load 20 with the colors status ranges from yellow to red. Based on the virtual load and/or the color status, the scheduler will make radio resource decisions in order to keep the offered load 22 at the target load 20 and maximize utilization of the radio network. For instance, in this range, as the color status moves from green to yellow to orange to red to black color status based on the virtual load increasing, the scheduler (e.g., RNC, WAP and the like) will reduce grants to keep the offered load 22 at the target load 20. When the virtual load reaches point C, the radio network is fully loaded. All users are granted a minimum grant and the offered load is equal to the target load. Embodiments herein enable the use of the virtual load to and precisely determine the state of the radio network and more proactively make radio resource decisions based on the virtual load of the radio network before overload conditions occur. Note that beyond point C, the radio network is in an overload region 12 with the offered load above the target load. The scheduler is not able to reduce the load via grant handling and any additional users provided a minimum grant will result in a sharply increased RTWP value FIG. 4 is a flow chart illustrating a method of radio resource management for packet data services according to one or more example embodiments described herein. The steps of method 400 will be described with reference to a network node (e.g., WAP 110, NB 112, RNC 114) in FIG. 1, but those skilled in the art will appreciate that method 400 may be performed in other systems. Also, the steps of the flow charts described herein are not all inclusive and may include other steps not shown, and the steps may be performed in an alternative order.

In step 410, network element (e.g., radio network node) of the radio network determines virtual load for the radio network. The virtual load is a value for a summation of load contribution from one or more User Equipments (UEs). The load contribution for respective ones of the one or more UEs is based on a minimum grant for the respective ones of the one or more UEs. The load contribution for respective ones of the one or more UEs may also be based on an optional activity factor. The minimum grant is a grant required to transport a minimum transport block size. For example, the minimum grant may be a grant assigned to a user of a channel when a radio network to which the radio network node belongs is loaded above a threshold (e.g., the grant to an EDCH user when the radio network is in overload). The optional activity factor for an individual UE may be used to normalizing the load contribution for the individual UE. The activity factor may be used to normalize the load contribution for transmission of less than a transport block allowed by the minimum grant to the UE. For example, the activity factor may be determined based on the received transport block size (TBS), e.g., activity factor=min(1, BS_received/TBS_1PDU).

In step 420, network element manages at least one radio resource based on the value of the summation. For example, the network element may be able to decide whether to use a Transmission Time Interval (TTI) of a first size or a TTI of a second size for a call with a UE. For example, the network element may be able to decide whether to use a first Packet Data Unit (PDU) size or a second PDU size for a call with a UE. For example, the network element may be able to decide whether to use a Signal Radio Bearer over an Enhanced Dedicated Channel (EDCH) or SRB over a Dedicated Channel (DCH) for a call. For example, the network element may be able to decide whether to trigger Intelligent Multi-Carrier Traffic Allocation (iMCTA) to redirect traffic for a call. For example, the network element may be able to decide whether to reject a call. For example, the network element may be able to decide whether to switch outer loop power control parameters for a call. For example, the network element may be able to decide whether to switch power-offset table for scheduling a call. For example, the network element may be able to decide whether to activate at least one secondary carrier in a Dual Cell or Multi-Cell High Speed Uplink Packet Access (HSUPA) configuration for a call.

In one embodiment, WAP 110 may determine the load contribution for individual UEs to be a minimum grant, and determine the value of the summation of the individual load contributions. The WAP 110 may then manage a radio resource base on the value of the summation.

In one embodiment, NB 112 may determine and forward the value of the summation of load contribution to RNC 114 for the RNC to determine of a setting for the at least one radio resource. The NB 112 may then manage the radio resource by receiving from the RNC 114 the setting for the radio resource and configuring the radio resource according to the setting.

In one embodiment, RNC 114 may receive from NB 112 one or more messages from which the RNC 114 may use to determine the value of the summation of load contribution. For example, a Node B Application Part (NBAP) Received Total Wideband Power (RTWP) common measurement report may be used to provide information concerning the virtual load from the Node B to the RNC. The RTWP common measurement report may include the DCH load contribution. This RTWP reported may be equal to reference RTWP plus a noise rise (e.g., RTWP=RTWP_ref+10*log 10 [1/(1−L_virtual)]); the RNC is then able to convert reported RTWP back to virtual load. The virtual load may or may not include the DCH load. The reference RTWP can be measured and reported separately by the NB or be a fixed system value. Alternatively, the received message/s may include individual load contributions for UE which the RNC may sum. Alternatively, the received message/s may include the value of the summation which the RNC determines by identifying the appropriate message field in the message. The RNC 114 then manages the radio resource by determine a setting for the at least one radio resource based on the value of the summation in comparison to one or more thresholds. The RNC may then send the setting determined for the radio resource to the NB 112 for implementation.

Figure 5:
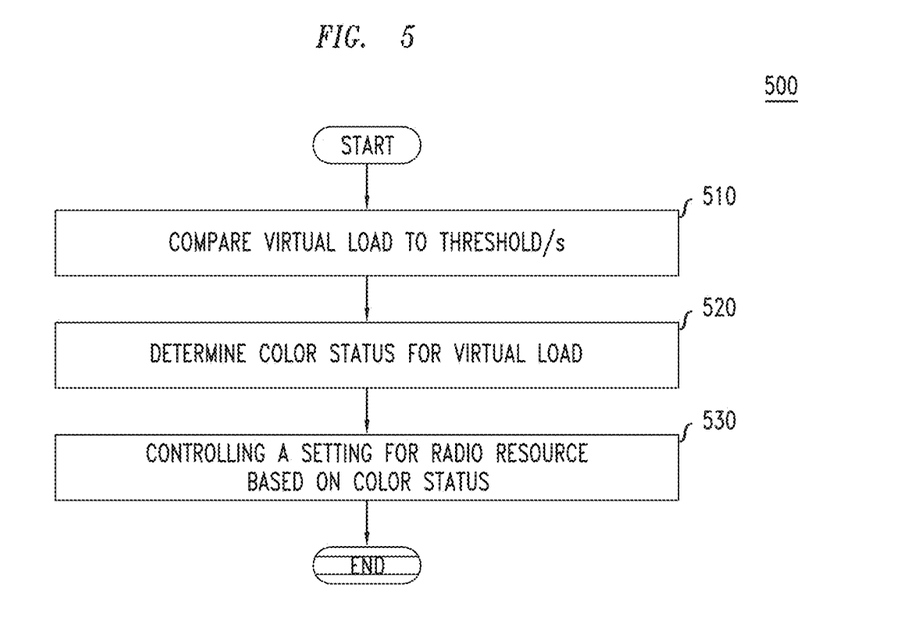
FIG. 5 is a flow chart illustrating a method of radio resource management for packet data services according to one or more example embodiments described herein.

FIG. 5 is a flow chart illustrating a method of radio resource management for packet data services according to one or more example embodiments described herein. The steps of method 400 will be described with reference to a network node (e.g., WAP 110, Nb 112, RNC 114) in FIG. 1, but those skilled in the art will appreciate that method 400 may be performed in other systems. Also, the steps of the flow charts described herein are not all inclusive and may include other steps not shown, and the steps may be performed in an alternative order.

As previously mentioned, the network element (e.g., RNC 114) may utilize a color scale to manage radio resources. For example, the network element may determine a color status based on the value of the summation with respect to a scale of virtual loading, and make a radio resource management decision concerning the at least one radio resource based on the color status.

Accordingly, in step 510, network element (e.g., radio network node) of the radio network compares the virtual load to one or more thresholds. In step 520, based on the comparison's to the threshold/s, the network element determines a color status for the virtual load. Any desired number of thresholds and colors is possible.

In step 530, based on the color status, the network element controls a setting for a radio resource. For example, a threshold can be established just below the load that will cause overload, such that a virtual load above this threshold will result in a black color status; based on the black color status, an incoming call can be redirected via iMCTA to avoid overload. One or more embodiments described herein combines the benefits of the direct number of user control (summation of users), real time radio condition measurement (i.e., EcIo that reflects the current load condition), and dynamic scheduler behavior (minimum load and activity), facilitating efficient radio resource management.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 6:
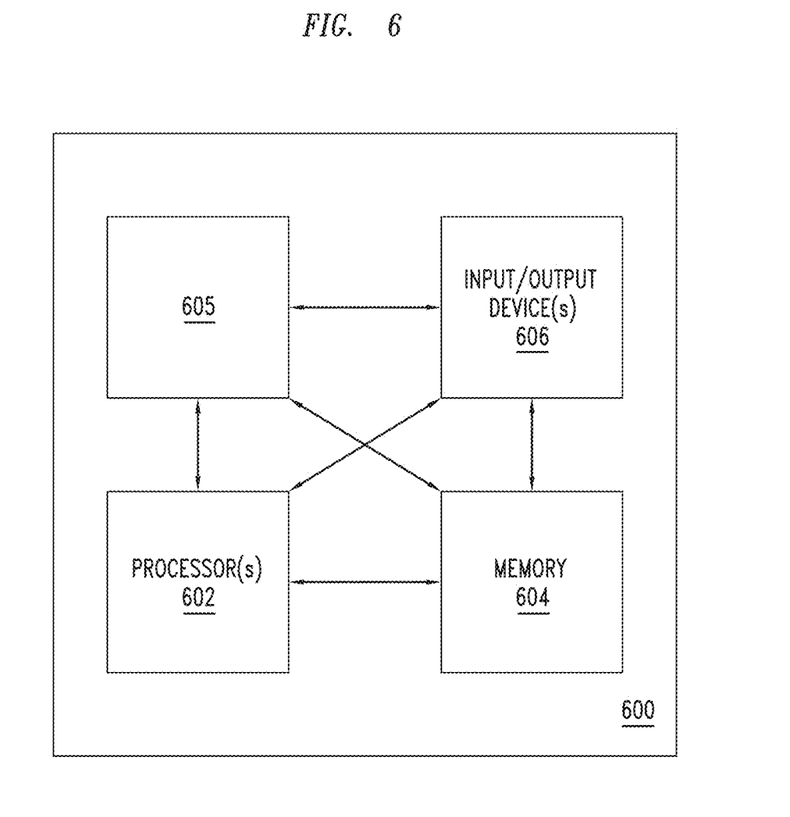
FIG. 6 depicts a high-level block diagram of a general purpose computing device suitable for use in various embodiments.

FIG. 6 depicts a high-level block diagram of a computing device, such as a processor in a telecom network element, suitable for use in performing functions described herein such as those associated with the various elements described herein with respect to the figures.

As depicted in FIG. 6, computing device 600 includes a processor element 602 (e.g., a central processing unit (CPU) and/or other suitable processor(s)), a memory 604 (e.g., random access memory (RAM), read only memory (ROM), and the like), cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

In the case of a routing or switching device such as WAP 110, NB 112, RNC 114, PDG/WLAN-GW 120, SGSN 140, GGSN/PGW 150 and the like, the cooperating module process 605 may implement various switching devices, routing devices, interface devices and so on as known to those skilled in the art. Thus, the computing device 600 is implemented within the context of such a routing or switching device (or within the context of one or more modules or sub-elements of such a device), further functions appropriate to that routing or switching device are also contemplated and these further functions are in communication with or otherwise associated with the processor 602, input-output devices 606 and memory 604 of the computing device 600 described herein.

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various embodiments contemplate an apparatus including a processor and memory, where the processor is configured to determine a value for a summation of load contribution from one or more UEs, the load contribution for respective ones of the one or more UEs based on a minimum grant for the respective ones of the one or more UEs; and manage at least one radio resource based on the value of the summation, and generally perform the functions described above with respect to the managing of a radio resource such as deciding a TTI size, PDU size and so on. The processor is configured to perform the various functions as described, as well communicate with other entities/apparatus including respective processors and memories to exchange control plane and data plane information in accordance of the various embodiments.

Although various embodiments which incorporate the teachings of the invention have been shown and described in detail herein, those skilled in the art can readily devise many other varied embodiments that still incorporate these teachings. Thus, while the foregoing is directed to various embodiments of the invention, other and further embodiments of the invention may be devised without departing from the basic scope thereof. As such, the appropriate scope of the invention is to be determined according to the claims.

The invention claimed is:

1. A method of radio resource management for packet data services, the method comprising:
assigning a minimum grant as one or more load contributions for one or more User Equipment (UEs) that have established one or more calls involving a radio network node;
determining at the radio network node a value for a summation of the one or more load contributions from the one or more UEs, wherein the value of the summation is a linear function of a number of the one or more UEs, and wherein determining a value for the summation comprises:
normalizing the one or more load contributions for the one or more UEs based on an activity factor for the one or more UEs, wherein the activity factor is determined based on a comparison of a received transport block size and a transport block size of one packet data unit; and
summing the value from the one or more load contributions that was normalized for the one or more UEs; and
managing at least one radio resource based on the value of the summation.

2. The method of claim 1 wherein the minimum grant is a grant required to transport a minimum transport block size.

3. The method of claim 1 wherein the minimum grant is a grant assigned to a user of a channel when a radio network to which the radio network node belongs is loaded above a threshold.

4. The method of claim 1 wherein the one or more load contributions for the respective ones of the one or more UEs is based on the minimum grant and an activity factor for the respective ones of the one or more UEs.

5. The method of claim 4 wherein the activity factor for a first UE of the respective ones of the one or more UEs accounts for transmission of less than a transport block size of one packet data unit.

6. The method of claim 1 wherein managing the radio resource based on the value of the summation comprises:
comparing the value of the summation to one or more thresholds; and
controlling a setting for the at least one radio resource based on the comparing.

7. The method of claim 1 wherein the at least one radio resource is a Transmission Time Interval (TTI) size, a Packet Data Unit (PDU) size, a channel type over which to send Signal Radio Bearer (SBR), a status trigger for traffic redirection, a status indicator for call admission, a status indicator for outer loop power control usage, a status indicator for usage of a power-offset table for scheduling, a status indicator for High Speed Uplink Packet Access (HSUPA) cell configuration, or a combination thereof.

8. The method of claim 1 wherein managing the radio resource based on the value of the summation comprises:
determining a color status based on the value of the summation with respect to a scale of virtual loading; and
making a radio resource management decision concerning the at least one radio resource based on the color status.

9. The method of claim 8 wherein making a radio resource management decision comprises:
deciding whether to use a Transmission Time Interval (TTI) of a first size or a TTI of a second size for a call with one of the one or more UEs;
deciding whether to use a first Packet Data Unit (PDU) size or a second PDU size for a call with one of the one or more UEs;

deciding whether to use a Signal Radio Bearer over an Enhanced Dedicated Channel (EDCH) or SRB over a Dedicated Channel (DCH) for a call with one of the one or more UEs;

deciding whether to trigger traffic redirection for a call with one of the one or more UEs;

deciding whether to reject a call with one of the one or more UEs;

deciding whether to switch outer loop power control parameters for a call with one of the one or more UEs;

deciding whether to switch power-offset table for scheduling a call with one of the one or more UEs;

deciding whether to activate at least one secondary carrier in a Dual Cell or Multi-Cell High Speed Uplink Packet Access (HSUPA) configuration for a call with one of the one or more UEs; or any combination thereof.

10. An apparatus for radio resource management for packet data services of a radio network, the apparatus comprising:

a processor and an associated memory, the processor configured to assign a minimum grant as one or more load contributions for one or more User Equipments (UEs) that have established one or more calls involving the radio network;

determine a value for a summation of the one or more load contributions from the one or more UEs, wherein the value of the summation is a linear function of a number of the one or more UEs; and manage at least one radio resource based on the value of the summation, wherein the value for the summation is determined by:

normalizing the one or more load contributions for the one or more UEs based on an activity factor for the one or more UEs, wherein the activity factor is determined based on a comparison of a received transport block size and a transport block size of one packet data unit; and summing the value from the one or more load contributions that was normalized for the one or more UEs.

11. The apparatus of claim 10 wherein the minimum grant is a grant required to transport a minimum transport block size.

12. The apparatus of claim 10 wherein the minimum grant is a grant assigned to a user of an Enhanced Dedicated Channel (EDCH) when the radio network is loaded above a threshold.

13. The apparatus of claim 10, wherein the activity factor for the one or more UEs accounts for transmission of less than the transport block size of one packet data unit.

14. The apparatus of claim 10 wherein the processor is configured to:

forward the value of the summation to a controller for determination of a setting for the at least one radio resource;

receive from the controller the setting for the at least one radio resource; and configure the at least one radio resource according to the setting for the at least one radio resource.

15. An apparatus for radio resource management for packet data services of a radio network, the apparatus comprising:

a processor and an associated memory, the processor configured to receive a value for a summation of one or more load contributions for one or more User Equipments (UEs) that have established a call involving the radio network, the load contribution for respective ones of the one or more UEs being assigned a minimum grant, wherein the value of the summation is a linear function of a number of the one or more UEs; and manage at least one radio resource based on the value of the summation, wherein the value for the summation is determined by:

normalizing the one or more load contributions for the one or more UEs based on an activity factor for the one or more UEs, wherein the activity factor is determined based on a comparison of a received transport block size and a transport block size of one packet data unit; and summing the value from the one or more load contributions that was normalized for the one or more UEs.

16. The apparatus of claim 15 wherein the processor is configured to:

determine a setting for the at least one radio resource based on the value of the summation in comparison to one or more thresholds.

17. The apparatus of claim 15 wherein the at least one radio resource is a Transmission Time Interval (TTI) size, a Packet Data Unit (PDU) size, a channel type over which to send Signal Radio Bearer (SBR), a status trigger for traffic redirection, a status indicator for call admission, a status indicator for outer loop power control usage; a status indicator for usage of a power-offset table for scheduling; a status indicator for High Speed Uplink Packet Access (HSUPA) cell configuration.

18. The apparatus of claim 15 wherein the processor is configured to:

determine a color status based on the value of the summation with respect to a scale of virtual loading; and make a radio resource management decision concerning the at least one radio resource based on the color status.

19. The apparatus of claim 18 wherein the processor is at least one of:

configured to decide, based on the color status, whether to use a Transmission Time Interval (TTI) of a first size or a TTI of a second size for a call with one of the one or more UEs;

configured to decide, based on the color status, whether to use a first Packet Data Unit (PDU) size or a second PDU size for a call with one of the one or more UEs;

configured to decide, based on the color status, whether to use a Signal Radio Bearer over an Enhanced Dedicated Channel (EDCH) or SRB over a Dedicated Channel (DCH) for a call with one of the one or more UEs;

configured to decide, based on the color status, whether to trigger traffic redirection for a call with one of the one or more UEs;

configured to decide, based on the color status, whether to reject a call with one of the one or more UEs;

configured to decide, based on the color status, whether to switch outer loop power control parameters for a call with one of the one or more UEs;

configured to decide, based on the color status, whether to switch power-offset table for scheduling a call with one of the one or more UEs; or configured to decide, based on the color status, whether to activate at least one secondary carrier in a Dual Cell or Multi-Cell High Speed Uplink Packet Access (HSUPA) configuration for a call with one of the one or more UEs.

20. A method of radio resource management for packet data services, the method comprising:

assigning a minimum grant as one or more load contributions for one or more User Equipment (UEs) that have established one or more calls involving a radio network node;

determining at the radio network node a value for a summation of the one or more load contributions from the one or more UEs, wherein the value of the summation is a linear function of a number of the one or more UEs, wherein the one or more load contributions for respective ones of the one or more UEs is based on the minimum grant and an activity factor for the respective ones of the one or more UEs, and wherein the activity factor for a first UE of the respective ones of the one or more UEs accounts for transmission of less than a transport block size of one packet data unit; and managing at least one radio resource based on the value of the summation.

21. An apparatus for radio resource management for packet data services of a radio network, the apparatus comprising:

a processor and an associated memory, the processor configured to:

assign a minimum grant as one or more load contributions for one or more User Equipments (UEs) that have established one or more calls involving the radio network;

determine a value for a summation of the one or more load contributions from the one or more UEs, wherein the value of the summation is a linear function of a number of the one or more UEs, wherein the one or more load contributions for respective ones of the one or more UEs is based on the minimum grant and an activity factor for the respective ones of the one or more UEs, and wherein the activity factor for a first UE of the respective ones of the one or more UEs accounts for transmission of less than a transport block size of one packet data unit; and manage at least one radio resource based on the value of the summation.

22. An apparatus for radio resource management for packet data services of a radio network, the apparatus comprising:

a processor and an associated memory, the processor configured to receive a value for a summation of one or more load contributions for one or more User Equipments (UEs) that have established a call involving the radio network, the load contribution for respective ones of the one or more UEs being assigned a minimum grant, wherein the value of the summation is a linear function of a number of the one or more UEs, wherein the one or more load contributions for respective ones of the one or more UEs is based on the minimum grant and an activity factor for the respective ones of the one or more UEs, and wherein the activity factor for a first UE of the respective ones of the one or more UEs accounts for transmission of less than a transport block size of one packet data unit; and manage at least one radio resource based on the value of the summation.

\* \* \* \* \*